United States Patent
Hamiel et al.

(10) Patent No.: US 6,705,370 B1
(45) Date of Patent: Mar. 16, 2004

(54) LOAD RANGE C AND D TIRES INCLUDING METALLIC CORD BELT LAYER OF SPECIFIED INCH STRENGTH

(75) Inventors: Charles Elmer Hamiel, Stow, OH (US); Italo Marziale Sinopoli, Canton, OH (US); Daniel Ignatius Kowalski, Jr., Stow, OH (US); Ray Allison Young, East Sparta, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/455,258

(22) Filed: Dec. 6, 1999

Related U.S. Application Data

(60) Division of application No. 08/824,134, filed on Mar. 27, 1997, now Pat. No. 6,293,326, which is a continuation-in-part of application No. 08/514,080, filed on Aug. 11, 1995, now abandoned, which is a division of application No. 08/360,973, filed on Dec. 20, 1994, now abandoned, which is a continuation-in-part of application No. 07/937,864, filed as application No. PCT/US91/01906 on Mar. 21, 1991, now Pat. No. 5,616,197, and a continuation-in-part of application No. 07/496,759, filed on Mar. 21, 1990.

(51) Int. Cl.[7] .................. B60C 9/00; B60C 9/20; D07B 1/06
(52) U.S. Cl. .................. 152/527; 57/902; 152/451; 152/526
(58) Field of Search .................. 152/527, 451, 152/526; 57/902

(56) References Cited

U.S. PATENT DOCUMENTS 6,247,514 B1 * 6/2001 Kim et al. .............. 152/451 X

* cited by examiner

Primary Examiner—Adrienne C. Johnstone

(57) ABSTRACT

Load Range C or D radial light truck tires have plies reinforced with metallic cords. At least one of the plies has an inch strength of at least 11,500 N/mm$^2$ per in. and is reinforced with 0.32 mm–0.40 mm filament diameter ultra tensile steel cords at 17–24 ends per inch. The ply may be located in any of the tire components such as the belt, carcass, chipper, or chafer.

6 Claims, 3 Drawing Sheets

LOAD RANGE C AND D TIRES INCLUDING METALLIC CORD BELT LAYER OF SPECIFIED INCH STRENGTH

This application is a divisional of U.S. application Ser. No. 08/824,134, filed Mar. 27, 1997, now U.S. Pat. No. 6,293,326, issued Sep. 25, 2001. U.S. application Ser. No. 08/824, 134 is a continuation-in-part of U.S. application Ser. No. 08/514,080 filed Aug. 11, 1995, now abandoned, which is a division of U.S. application Ser. No. 08/360,973 filed Dec. 20, 1994, now abandoned. U.S. application Ser. No. 08/824, 134 is also a continuation-in-part of U.S. application Ser. No. 07/937,864 filed Oct. 13, 1992, now U.S. Pat. No. 5,616,197 and also is a national stage application (371) of PCT/US91/01906, filed Mar. 21, 1991, which is a continuation-in-part of U.S. application Ser. No. 07/496,759 filed Mar. 21, 1990, now U.S. Statutory Invention Registration H1333. The above applications are hereby incorporated by reference thereto.

This application is a Continuation-in-Part of two prior U.S. applications. The first is co-pending U.S. application Ser. No. 08/514,080 filed Aug. 11, 1995, disclosing 2×0.35 ultra tensile cord for light truck tires, and the second is a co-pending U.S. application Ser. No. 07/937,864 filed Oct. 13, 1992, which was a CIP of U.S. application Ser. No. 07/496,759 filed Mar. 21, 1990, now a statutory invention registration number H-1333, the latter disclosing 2×0.255 super tensile cord and the former 2×0.30 super tensile cord. The above latter and former applications are hereby incorporated by reference thereto.

FIELD OF THE INVENTION

The present invention relates to cord for tires and radial tires for vehicles, i.e., those tires wherein the cords of the carcass plies which extend from one bead to the other lie substantially on radial planes.

Particularly, the present invention relates to light truck tires having less weight favoring low-rolling resistance to absorb less horsepower while maintaining the strength of the previous heavier construction as well as ride and handling with a simpler construction cord of greater corrosion resistance.

Assignees prior application, now published as EPO 237, 462 on Sep. 16, 1987, discloses a two-ply passenger tire belt having cords of 2×0.30 high tensile construction. The high tensile material used was described as high-carbon steel with a carbon content by weight of greater than 0.80%.

Co-pending with this application is Assignees U.S. application Ser. No. 07/843,133 filed Feb. 28, 1992, now abandoned disclosing 0.35 filaments both untwisted and twisted of super tensile material in a cord for a reinforcement, particularly for radial medium truck tires.

BACKGROUND OF THE INVENTION

Assignees' previous light truck tires had a common cord, 2+2×0.30 high tensile for load range C and D tires, U.S. Pat. No. 5,188,685 issued Feb. 23, 1993, and 2+2×0.35 ST for load range E tires, U.S. Pat. No. 5,242,001 issued Sep. 7, 1993. The present invention using 2×0.35 cord, maintains a common 2× cord for these load ranges while taking the next step forward by reducing the number of filaments in the cord from four to two. An alternate cord, 3×0.35 increases the number of filaments, but reduces the required tensile strength where the tensile strength for 2× cord would otherwise exceed what is available in current commercial materials. A key to efficient use of reinforcement is to use only as much as required by the product, but it is not always simply a matter of increasing a filament diameter to reach such a goal. Where the diameter increase still results in an unobtainable tensile strength, a filament may have to be added, or the material changed, or the ends per inch of cord changed, etc. To identify a specific type of cord for use over the widest range of variables, including use of super tensile and ultra tensile materials, it was found that the best way to illustrate the variables was graphically as in FIG. 4 below where the preferred embodiment of 2× cord and an alternate embodiment of 3× cord show how the variables for these cords can be brought together is illustrated.

SUMMARY OF THE INVENTION

Advantages which exist in the present cord over the previous cord include improved corrosion resistance and a weight reduction due to reduction in weight of reinforcement as well as reduction in the amount of total gum rubber gauge due to the smaller diameter of the present cord, all of which result in a reduction in cost for the tire of the present invention. Further, the new belt structure using the present cord is expected to give equal or better rolling resistance where it is recognized that the belt, even though having a smaller diameter cord, has a higher bending stiffness for the belt structure.

This invention provides the above advantages in a load range C and D pneumatic radial tire with a carcass having radial cords and two sidewalls spaced apart a distance which, in the axial direction, determines the width of the tire section. The tire has two beads each one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the tread and has two radially overlapped layers of elastomeric fabric reinforced with metallic cords. The metallic cords are parallel to each other in each layer, which layers have a density of 28 ends per inch with a filament tensile strength of at least 3500 MPa and a 032 mm filament diameter. The cords of one layer are crossed with the other layer and inclined at an angle of between 16° and 30° with respect to the equatorial plane of the tire. The metallic cords being two single filaments twisted one about the other.

Further, this invention provides a pneumatic radial tire with a carcass having radial cords, two sidewalls spaced apart a distance, which in the axial direction, determines the width of the tire section, two beads each one of which around which are turned up the ends of the cords of the carcass, and a belt structure that is circumferentially inextensible interposed between the tread and the carcass, the belt structure having a width that is substantially equal to that of the tread and having at least two radially overlapped layers of elastomeric fabric reinforced with metallic cords, the metallic cords being parallel to each other in each layer, comprising at least one layer of cords comprising two filaments twisted about each other having a diameter of about 032 mm to 0.40 mm and a filament tensile strength (T) of at least T=6908–10740 (d) for a Load Range D tire.

Lastly, this invention provides a pneumatic tire with a carcass having radial cords, two sidewalls spaced apart a distance, which in the axial direction, determines the width of the tire section, two beads each one of which around which are turned up the ends of the cords of the carcass, and a belt structure that is circumferentially inextensible interposed between the tread and the carcass, the belt structure having a width that is substantially equal to that of the tread and having at least two radially overlapped layers of elastomeric fabric reinforced with metallic cords, the metallic cords being parallel to each other in each layer, comprising at least one layer of an inch strength (In.Str.) of at least 11,500 N/mm$^2$ per in. for Load Range C wherein:

In.Str. (Newtons/mm$^2$ per inch)=N{CE(C-2000 Newtons/ mm$^3$·d)}EPI

N=number of filaments per cord=2[OR MORE] or more d=filament diameter=0.32 to 0.40 mm CE=Cord Efficiency EPI=cord end count=17 to 19 ends/inch C=4080 to 4400 Newtons/nm$^2$ while for Load Range C and D the In.Str. would be at least 14,500 N/mm$^2$ per in. and the ranges for EPI, 17–24 and C=4080 to 4400.

In further aspects of the present invention, the filament diameters of both filaments in the cord are 0.35 mm diameter and the ends per inch are 17 with ultra tensile and 19 with super tensile material for load range C tires and 21 ends per inch for ultra tensile and 24 ends per inch for super tensile for load range D tires.

The features of the present invention, which are believed to be novel, are set forth with particularity in the appended claims.

BRIEF DESCRIPTION OF THE DRAWINGS

The present invention, both as to its structure and manner of operation, may best be understood by reference to the following detailed description, taken in accordance with the accompanying drawings in which.

DEFINITIONS

Figure 1:
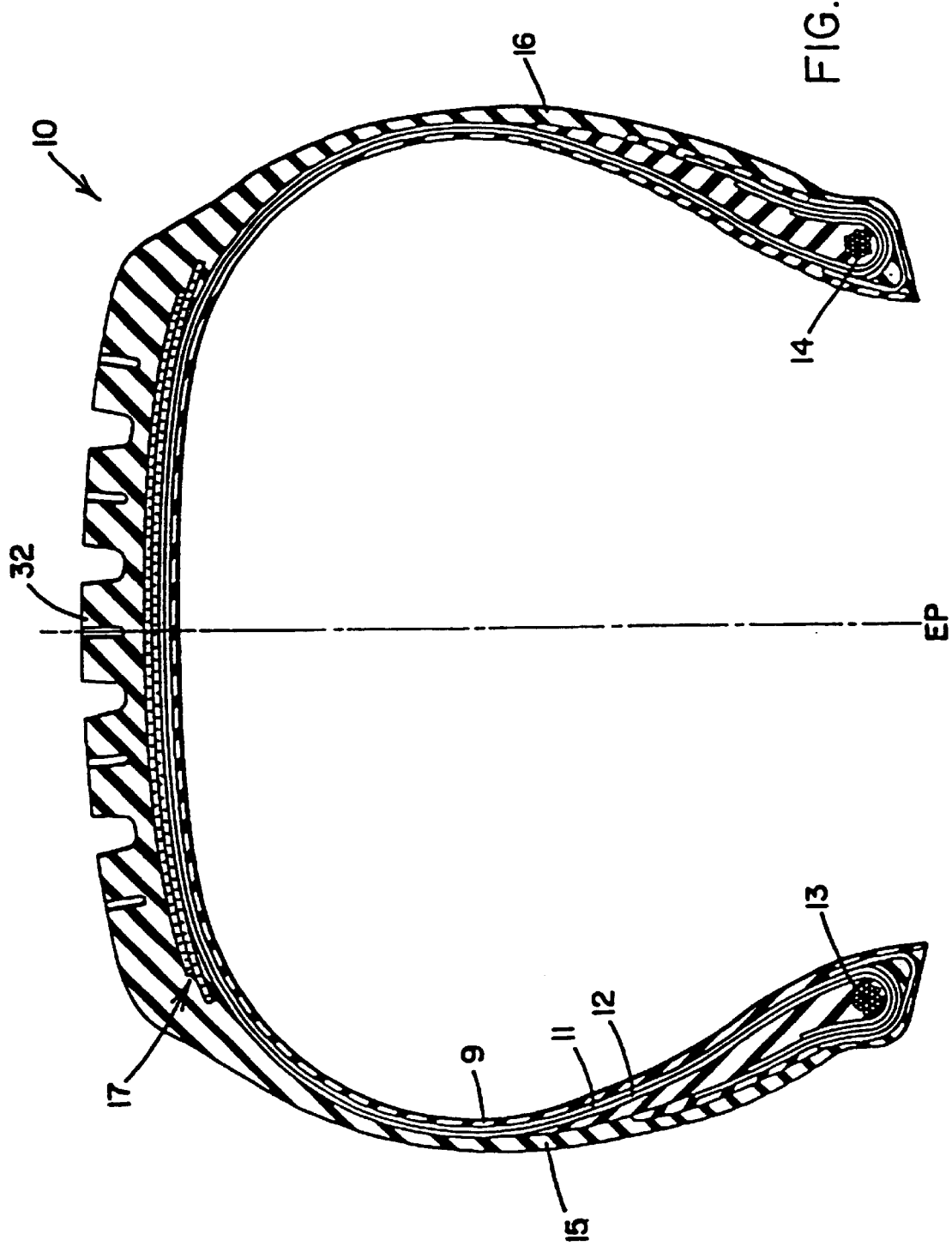
FIG. 1 is a cross-sectional view of a tire in a plane that contains the axis of rotation of the tire and in accordance with the present invention.

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toeguards and chafers, to fit the design rim.

"Belt structure" means at least two layers or plies of parallel cords, woven or unwoven, underlying the tread, unanchored to the bead, and having both left and right cord angles in the range from 16 degrees to 30 degrees with respect to the equatorial plane of the tire.

"Carcass" means the tire structure apart from the belt structure, tread, undertread, and sidewall rubber over the plies, but including the beads.

"Cord" means one or more of the reinforcement elements, formed by one or more filaments/wires which may or may not be twisted or otherwise formed which may further include strands so formed which strands may or may not be also so formed, of which the plies in the tire are comprised.

"Crown" means that portion of the tire within the width limits of the tire tread.

"Density" means quantity per unit length.

"Equatorial plane (EP)" means the plane perpendicular to the tire's axis of rotation and passing through the center of its tread.

"Gauge" means material thickness.

"High Tensile Steel (HT)" means a carbon steel with at least 0.80% carbon by weight, or a tensile strength of at least 3240 MPa at 0.30 mm filament diameter.

"Super Tensile Steel (ST)" means a carbon steel with a content by weight of between 0.78% and 0.86% carbon, 0.3% to 1.0% Si and between 0.1% and 0.5% of an alloying element from a class of the following elements: Cr, Ni, Co, W, V and Nb, and any combination thereof, the balance being iron and residuals, or a tensile strength of at least 3380 MPa at 0.35 mm filament diameter.

"Ultra Tensile Steel (UT)" means a steel as disclosed in U.S. Pat. No. 6,099,797 issued Aug. 8, 2000 and hereby incorporated by referring thereto or carbon steel with a tensile strength of at least 3700 MPa at 0.35 mm filament diameter.

"Load Range C and D" means load and inflation limits for a given tire used in a specific type of service as defined by tables in *The Tire and Rim Association, Inc.*, 1989 Year Book.

"Radial" and "radially" are used to mean directions radially toward or away from the axis of rotation of the tire.

"Section width" means the maximum linear distance parallel to the axis of the tire and between the exterior of its sidewalls when and after it has been inflated at normal pressure for 24 hours, unloaded, excluding elevations of the sidewalls due to labeling, decoration or protective bands.

"Stiffness Ratio" means the value of the control belt structure stiffness divided into the value of another belt structure when the values are determined by a fixed three (3) point bending test having both ends of the cord fixed and flexed by a load centered between the fixed ends.

"Tread" means that portion of a tire that comes into contact with the road when the tire is normally inflated and under normal load.

DETAILED DESCRIPTION OF THE INVENTION

Figure 2:
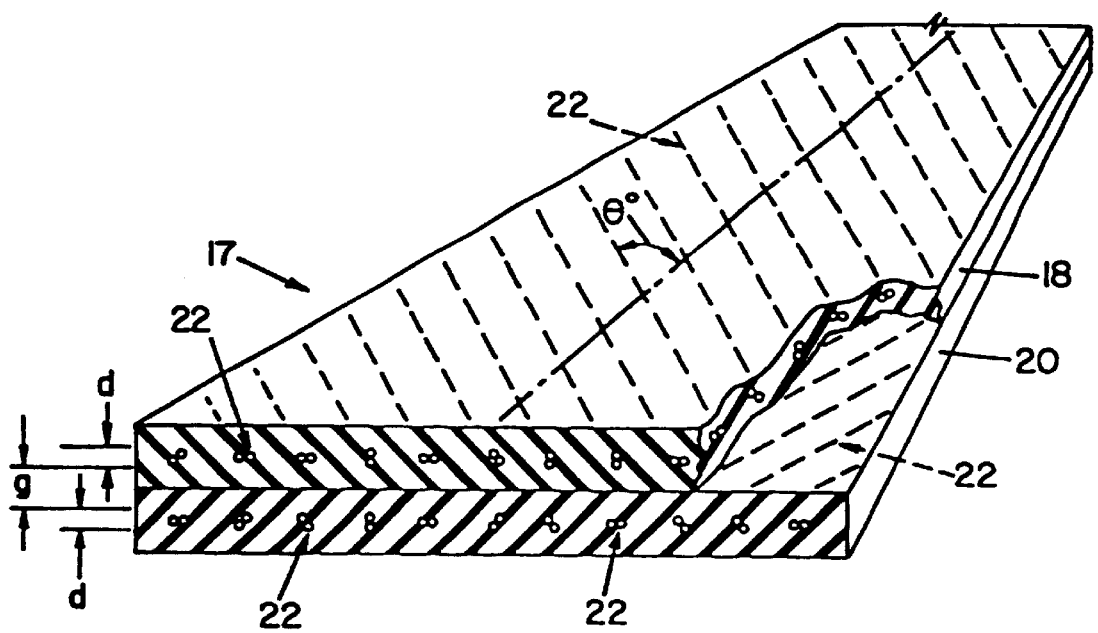
FIG. 2 is an enlarged schematic of the annular reinforcing portion of the tire shown in FIG. 1.
Figure 3:
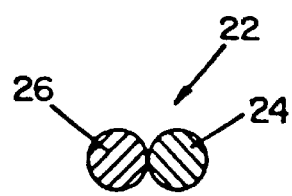
FIG. 3 is an enlarged cross-sectional view of a cord from the reinforcing portion of the tire in FIG. 2.

Referring to FIGS. 1 to 3, there is illustrated, by means of a working example, a tire of size LT225/75R16 for load ranges C and D. For the preferred embodiments illustrated herein all actual dimensions given therein are for a tire of the above size. A pneumatic tire 10 according to the invention has what is commonly referred to in the tire art as a radial ply carcass structure. For the purposes of the present invention, a tire has a radial ply carcass structure when the cords of the carcass reinforcing ply, or plies 11, 12, are oriented at angles in the range of 75° to 90° with respect to the equatorial plane (EP) of the tire.

The tire 10 according to the invention has a pair of substantially inextensible annular beads 13, 14 which are axially spaced apart from one another. Each of the beads 13, 14 is located in a bead portion of the tire which has exterior surfaces configured to be complimentary to the bead seats and retaining flanges of a rim (not shown) upon which the tire is designed to be mounted. A radial ply carcass structure, in the preferred embodiment comprising two plies 11, 12 of side-by-side reinforced cords of polyester material, extends between the beads with an axially outer portion of the carcass structure folded about each of the beads. While in the preferred embodiment, the carcass ply structure comprises two plies of reinforcing material, it is understood that one or more carcass plies of any suitable material may be employed without deviating from the scope of the present invention.

Preferably, a tire according to the invention is a tubeless tire having a layer of a low permeability material 9 disposed inwardly of the carcass plies 11, 12 and contiguous to an inflation chamber defined by the tire and rim assembly. Elastomeric sidewalls 15, 16 are disposed axially outwardly of the carcass structure. A circumferentially extending belt structure 17 comprising two layers 18, 20 (FIG. 2), each of which preferably comprises steel reinforcing cords 22 (FIG. 3) characterized by the cords 22 having filaments 24, 26 with a breaking strength of at least 3380 MPa at 0.35 mm filament diameter. Each cord 22 has two filaments 24, 26 twisted together with a 16 mm lay length. This cord is designated as 2× and is known for its openness and good rubber penetration resulting from the openness.

More particularly, load range C tires are built with two belts as illustrated in FIG. 2 with alternately 2×0.35 super tensile cords at 19 ends per inch or 2×0.35 ultra tensile cords at 17 ends per inch with the angle θ of one ply being approximately 21° and the other ply having an identical but opposing angle. Load range D tires were built with two belts as illustrated in FIG. 2 with alternately 2×0.35 super tensile cord at 24 ends per inch or 2×0.35 ultra tensile cord at 21 ends per inch with the same cord angle θ and ply construction as described above for load range C tires. It is anticipated that metallic cord density in the belt layers from 13 to 28 ends per inch will be useful for load ranges C and D tires with the filament diameter ranging from 0.32 to 0.40 mm. Tires of the above preferred embodiments are presently under tests and anticipated to give equal or better results to the control tire of 2+2×0.30 high tensile cord construction.

Tables 1 and 2 below compare the control (2+2×0.30 high tensile) cord to that of the present invention.

TABLE I 2X.35 STEEL CORD FOR RLT BELTS

| | 2 + 2X.30 HT (CONTROL) | 2X.35 ST | 2X.35 UT |
|---|---|---|---|
| LR-C TIRES | | | |
| EPI | 13 | 19 | 17 |
| Steel Cord Weight (lbs/tire) | 2.12 | 2.12 | 1.90 |
| Compound Weight (lbs/tire) | 2.64 | 2.42 | 2.47 |
| Treatment Weight (lbs/tire) | 4.77 | 4.54 | 4.37 |
| Weight Savings (lbs/tire) | | 0.23 | 0.40 |
| LR-D TIRES | | | |
| EPI | 17 | 24 | 21 |
| Steel Cord Weight (lbs/tire) | 2.69 | 2.60 | 2.28 |
| Compound Weight (lbs/tire) | 2.41 | 2.25 | 2.31 |
| Treatment Weight (lbs/tire) | 5.10 | 4.85 | 4.59 |
| Weight Savings (lbs/tire) | | 0.25 | 0.51 |

TABLE II 2X.35 STEEL CORD FOR RLT BELTS

| | 2 + 2X.30HT | | 2X.35ST | | 2X.35UT | |
|---|---|---|---|---|---|---|
| | 13 EPI | 17 EPI | 19 EPI | 24 EPI | 17 EPI | 22 EPI |
| Tire Application | (CONTROL) LR-C | LR-D | C | D | C | D |
| Steel Cord Properties | | | | | | |
| Breaking Strength (N) | 890 | 890 | 618 | 618 | 680 | 680 |
| Maximum Gauge (mm) | 0.90 | 0.90 | 0.70 | 0.70 | 0.70 | 0.70 |
| Bending Stiffness | 324 | 324 | 300 | 300 | 300 | 300 |
| Layer Properties | | | | | | |
| EPI | 13 | 17 | 19 | 24 | 17 | 21 |
| Rivet (inch) | .042 | .023 | .025 | .014 | .031 | .020 |
| Inch-Strength (N/in) | 11600 | 15100 | 11700 | 14800 | 11600 | 14300 |
| Inch-Stiffness | 4200 | 5500 | 5700 | 7200 | 5100 | 6300 |

For both load ranges C and D, Table I illustrates a weight savings of the present cord over Control and, further, in both instances, the ultra tensile cords provide greater savings over even the super tensile cord constructions. These weight savings also will result in cost savings in the tires as well.

In Table II, the cord properties are first compared to Control and are seen to be below the strength limitations and stiffness of the Control cord, however, when the properties of the layer which the present cords form is compared to the layer formed by the Control cord, it can be seen that the inch strength and inch stiffness of the present layer exceeds that of the Control layer even though the cord properties are below that of the Control cord. While as is noted above testing is ongoing, it is anticipated that the increased strength and stiffness may well result in higher rolling resistance; but in any case, it is anticipated that at least equal performance to Control will be achieved.

Figure 4:
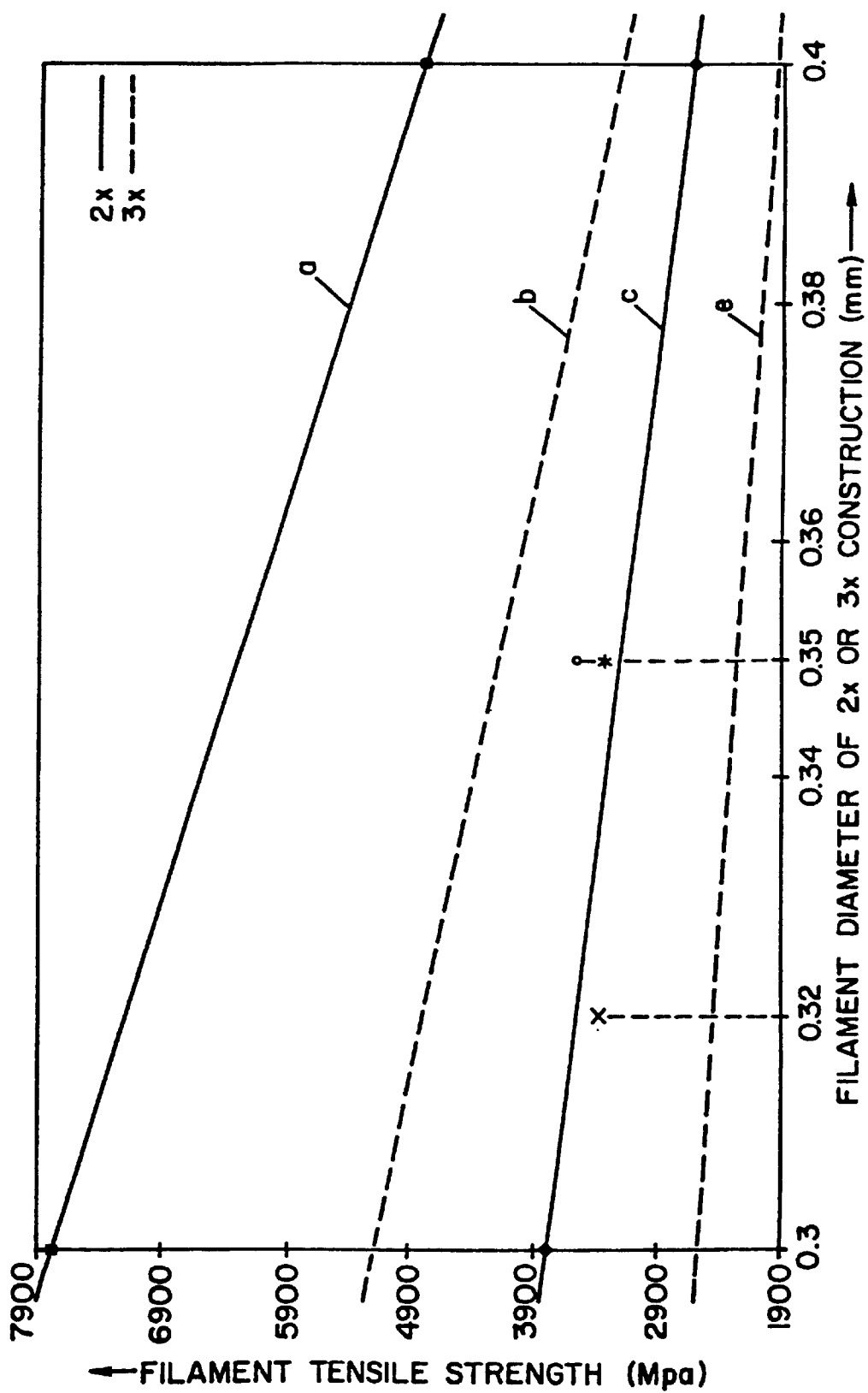
FIG. 4 is a graph illustrating tensile strength of cord filament in relation to filament diameter.

The weight savings are from a reduction in not only the weight of the reinforcing cord, but also from a reduction in the treatment gauge needed to encapsulate the reinforcing cord. Turning to FIG. 2, it can be appreciated that if the treatment gauge decreases with cord diameter (d), then gum between the cord will be reduced as well. The gum gauge (g) can remain constant with changing cord diameter. For example, if the cord diameter is the smallest surrounding circle around the maximum cross-section height of the cord, the load range C & D previous cord of 2+2×0.30 high tensile has a cord diameter of 0.035 inches, while the 2×0.35 super and ultra tensile cords of the present invention have a diameter of 0.028 inches. As a result, with a treatment gauge of 0.056 inches for the 2+2×0.30 high tensile cord, and maintaining an equal gum gauge (g), the treatment gauge of the 2×0.35 super and ultra tensile cords of the present invention would be 0.048 inches, a 14% reduction. The above reduction made production of reinforcement for tires in load ranges C and D more economical. The identification of a common cord and recognition of dual strength ranges is exemplified by the chart in FIG. 4 which illustrates the preferred embodiment 2×0.35 cord together with alternate 3×0.35 cord. This chart was developed using the minimum and maximum rivets for both cords and the required inch strength for Load Range C and D tires. The upper range of 2× cord construction is defined by line a, and the expression T=14238−25590 (d), and the lower limit by the line C and the expression T=6908−10740 (d). Similarly, for 3× cord, the upper dashed line b has the expression T=9616−17370 (d) and the lower dashed line e the expression T=4998−8140 (d). Similar lines can be developed for other similar type cords.

The chart shows the relationship between filament tensile strength in MPa plotted on the vertical axis, and the filament diameter in mm plotted on the horizontal axis.

Ideally, the cord is chosen to be close to the bottom line for better economy, less weight and better rolling resistance, etc. For example, for 2× cord of 0.35 mm diameter, the use of super tensile material gives a value of T=3380 MPa, which is just above the line, see the asterisk, while if ultra tensile material were used, the value for T would be 3700 MPa, see the circle, which is more conservative. On the other hand, if super tensile material was used with 2× cord at 032 mm, its value of 3440 MPa can be seen at X to be inadequate while ultra tensile with its value of 3760 MPa would be adequate.

What has been demonstrated is a type cord construction for use in pneumatic radial tires, particularly light truck tires, but useful for any ply of a tire, such as carcass, or component i.e. chipper, chaffer, etc.

In accordance with the provisions of the patent statutes, the principal and mode of operation of the tires have been explained in what is considered to be their best embodiment have been illustrated and described. It should, however, be understood that the invention may be practiced otherwise than as specifically illustrated and described without departing from its spirit and scope.

We claim:

1. A Load Range C or D pneumatic radial tire with a carcass having radial cords, two sidewalls spaced apart a distance, which in the axial direction, determines the width of the tire section, two beads each one of which around which are turned up the ends of the cords of the carcass, a tread radially outward of the carcass, and a belt structure that is circumferentially inextensible interposed between the tread and the carcass, the belt structure having a width that is substantially equal to that of the tread and having two radially overlapped layers of elastomeric fabric reinforced with metallic cords, the metallic cords being parallel to each other in each layer, comprising at least one of said two radially overlapped layers having an inch strength (In.Str.) of at least 11,500 N/mm$^2$ per in. wherein:

In.Str. (Newtons/mm$^2$ per inch)=N{CE(C−2000 Newtons/mm$^3$·d)}EPI

N=number of filaments per cord=2[OR MORE] or more d=filament diameter=0.32 to 0.40 mm CE=Cord Efficiency EPI=cord end count=17 to 24 ends/inch C=4080 to 4400 Newtons/mm$^2$.

2. THE tire of claim 1 wherein d=0.35 mm and N=2.

3. The tire of claim 2 wherein EPI=17 ends/inch and C=4400 Newtons/mm$^2$.

4. The tire of claim 1 wherein the tire is Load Range D, In.Str.=at least 14,500 N/mm$^2$ per in., and EPI=21 to 24 ends/inch.

5. The tire of claim 4 wherein d=0.35 mm and N=2.

6. The tire of claim 5 wherein EPI=24 ends/inch and C=4080 N/mm$^2$.

* * * * *